United States Patent Office 3,562,801
Patented Feb. 9, 1971

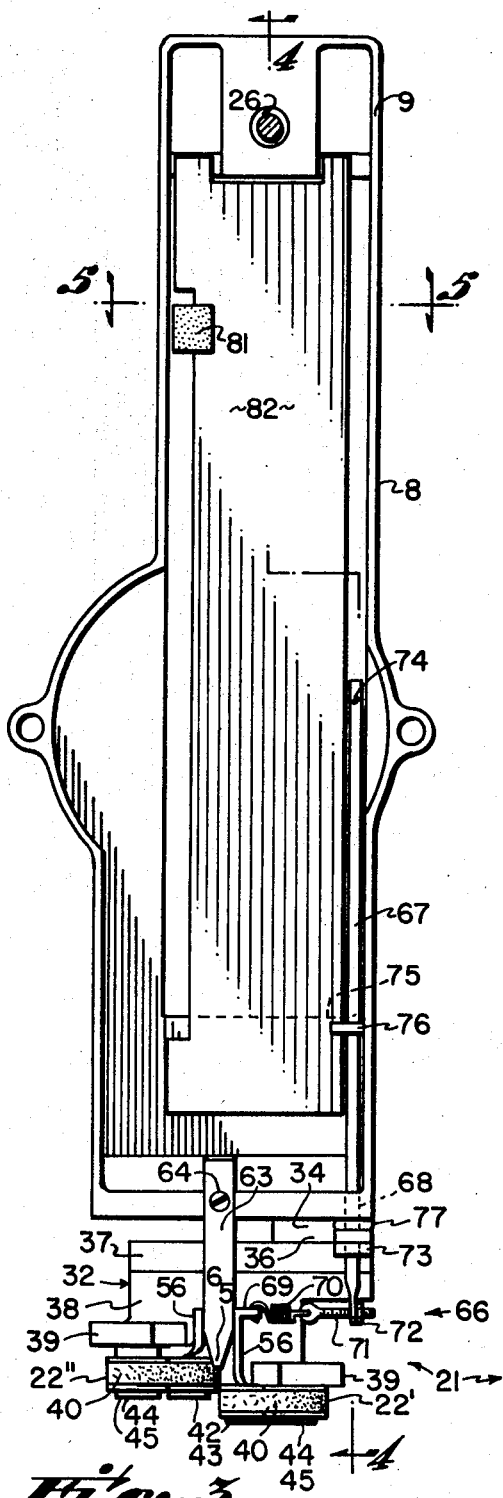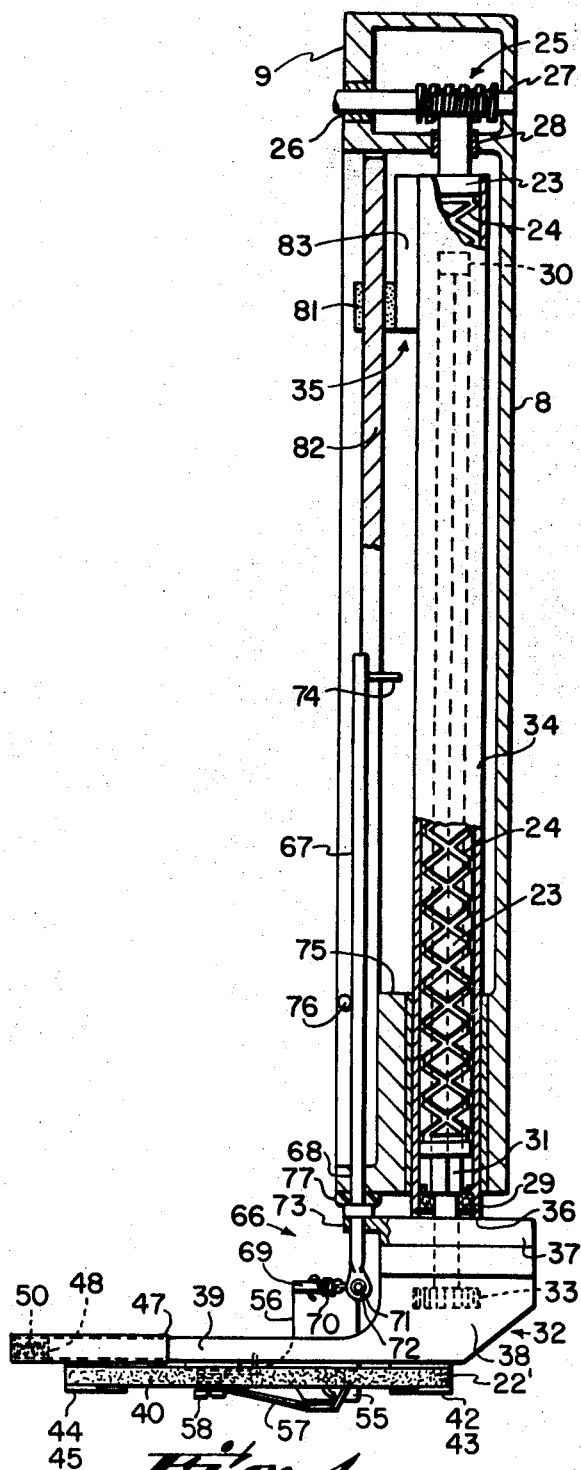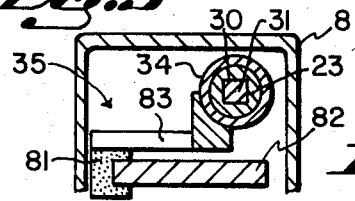

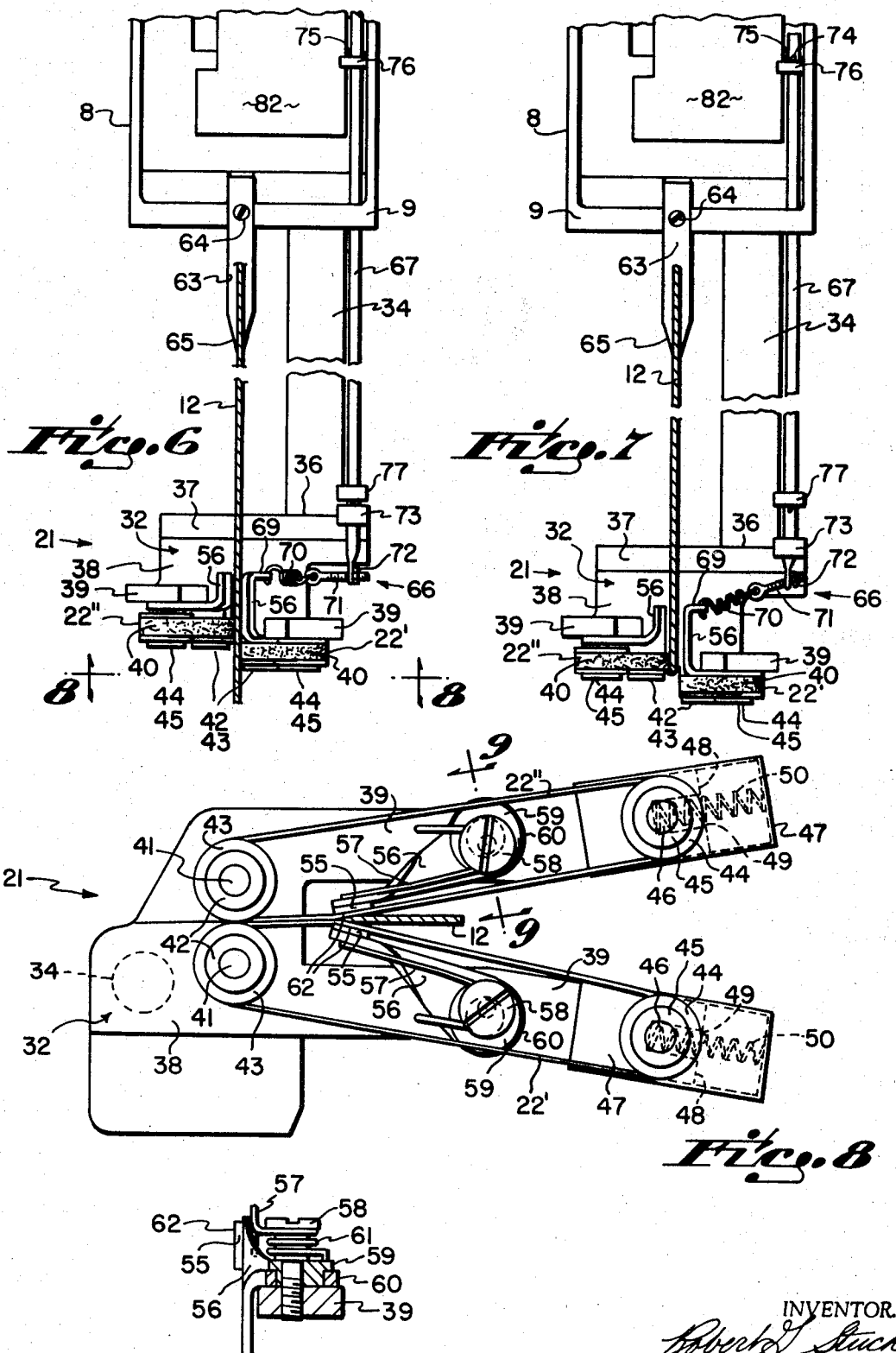

3,562,801
BELT-TYPE BLADE SHARPENER APPARATUS FOR A CLOTH CUTTING MACHINE
Robert G. Stucker, Cincinnati, Ohio, assignor to The Wolf Machine Company, Cincinnati, Ohio, a corporation of Ohio
Filed Sept. 11, 1968, Ser. No. 759,073
Int. Cl. B24b 19/00
U.S. Cl. 51—246       10 Claims

ABSTRACT OF THE DISCLOSURE

A pad arrester for an endless belt-type blade sharpener used with a vertical blade cloth cutting machine. The pad arrester prevents the bottom belt's pad from urging the bottom belt into the reciprocating knife blade's path when the blade sharpener apparatus reaches the halfway point of its sharpening cycle, that is, when the blade sharpener bottoms out as it ends its downward stroke and starts its return stroke. Thus, the pad arrester prevents the bottom belt of the blade sharpener from being sliced through and/or the blade from being disfigured as the sharpener apparatus commences its return stroke.

---

The bottom belt's pad is prevented from pushing the bottom belt into the knife blade's path as the sharpener bottoms out by a tension spring secured at one end to the pad and at the other end to a control rod. The control rod is slidably mounted in the stationary drive mechanism housing for the reciprocating knife blade so the spring can follow the downward and return strokes of the sharpener housing. Hence, when the blade sharpener bottoms out during a sharpening cycle the tension spring can function to prevent the bottom belt from being urged by the pad into the reciprocating path of the knife blade.

This invention relates to cloth cutting machines and, more particularly, relates to improvements in a belt-type blade sharpener for cloth cutting machines that utilizes a vertically reciprocating knife blade.

Cloth cutting machines are widely used throughout industry for cutting stacks of fabric layers into various pattern designs from which numerous articles such as clothes and the like can be made. One problem constantly arises with cloth cutting machines of the vertically reciprocating knife blade type; that problem is recurring dullness of the knife blade. The leading edge of the knife blade which, of course, engages and cuts the stack of fabric layers, must periodically be sharpened so as to maintain it as an efficient cutting edge during operation and use of the machine. Various means have been designed for sharpening the knife edges of a vertically reciprocating knife blade; one sharpening device employs grinding wheels on each side or bevel of the blade's cutting edge that only rotate upon direct contact with the knife blade, and another sharpening device employs simultaneously rotating grinding wheels that are power driven on each side of the knife blade. A third type of sharpening device is broadly known as a belt type sharpener which type provides two endless belts rotating in horizontal planes, one belt being provided for each side or bevel of the knife blade.

Belt-type sharpeners for cloth cutting machines generally comprise a V-shaped carriage or housing with the housing being so positioned that the vertical cutting edge of the blade is received in the notch defined by the two arms of the housing. As mentioned, a separate belt is provided for each side of the knife blade, each belt rotating about spaced spindles one of which is located at the tip of an arm and the other of which is located toward the apex of the V-shaped housing. The belts are urged into intimate or sharpening engagement with the beveled edge of the knife blade by means of pressure shoes or pads over which the belts ride in that area where they are to operatively engage the blade's cutting edge. Because there is a belt on each side of the knife blade the two belts cannot be positioned in the same horizontal plane for the simple reason that it would not be possible for them to form a truly knife edge at the cutting edge of the blade without engaging or scraping one another. Hence, such endless belts are positioned to operate in different horizontal planes, one below the other, so that a true knife edge can be formed on the cutting blade.

When a blade sharpener of the endless belt type, as described above, is used to sharpen a vertically reciprocating knife blade it traverses, in a vertically reciprocating manner, a cycle or path beginning with a home position at the top of the blade downward toward the bottom of the blade until it bottoms out from where it returns back upward to its home position. When the sharpener is bottomed out the lower one of the two belts is forced to leave contact with that side of the blade it sharpens so that the bottom portion of the opposite side of that blade can be sharpened by the upper endless belt. This for the reason that the two belts are disposed in different horizontal planes. When the lower belt is thus disengaged or no longer in contact with the knife blade at the bottom of the belt sharpener cycle, that belt tends to be pushed underneath the knife blade, that is, into the blade's reciprocating path, because it is constantly urged toward the knife blade cutting edge by a pressure pad or shoe during the sharpening cycle. Hence, when the belt sharpener is at the bottom of its cycle the upper endless belt is sharpening the bottom edge of the knife blade but the lower belt is no longer in contact with the knife blade and, without the advantageous structure of this invention, will be urged into the reciprocative cutting path of that blade. Thus, when the belt sharpener commences the return stroke of its cycle the bottom belt may be directly in line with the bottom edge of the reciprocating knife blade, the bottom edge usually being angled downward from the vertical cutting edge. The knife blade's bottom edge will then cut or otherwise damage the lower endless belt unless some means, such as are provided with this invention, keep that belt out of the knife blade's reciprocating path.

The corner of the knife blade where the bottom edge joins the vertical edge constitutes an extremely critical area of the knife blade in that a substantial portion of the cloth cutting function is performed by the knife edges at this general area of the blade. Hence, it is also critical that this corner area of the knife blade be maintained in a well sharpened attitude without burrs, edge undulations, or the like, in that area. The apparatus of this invention permits the knife blade to be evenly sharpened in all areas including that critical corner area at the bottom of the blade by maintaining the lower belt in the desired path of rotation even when the sharpener is bottomed out during its sharpening cycle.

Endless belt-type sharpeners for cloth cutting machines, because they are generally driven by a drive shaft positioned in a plane offset from the vertical reciprocating plane of the knife blade, tend to cock or pivot or become misaligned by reason of the torque developed by the drive shaft for the endless belts. This cocking of the belt sharpener causes alignment problems of the endless belts with the cutting edge of the knife blade and, therewith, uneven sharpening or beveling of the blade as well as deformation of the blade's bottom portions. When considered in combination with the problems occurring while sharpening the critical bottom corner area of the knife blade due to the endless belts functioning in separate horizontal planes, the cocking problem is magnified in that it becomes all the harder to obtain desirable sharpening characteristics for the belt sharpener for the critical bottom corner area portions of the vertically reciprocating knife blade. The apparatus of this invention also cooperates to prevent the cocking of the blade sharpener housing or carriage as it traverses its sharpening cycle.

Hence, it has been one objective of this invention to provide means whereby the lower endless belt of a belt-type blade sharpener for a cloth cutting machine is maintained in accurate sharpening position relative to the knife blade even when that lower belt is not in direct contact with the reciprocating knife blade at the bottom of a sharpening cycle.

It has been another objective of this invention to provide suitable guide means for a belt-type blade sharpener when the blade sharpener drive shaft is offset in a plane separate from the reciprocating plane of the knife blade, so that the endless belts are not cocked out of position relative to the knife blade at any point on either the downward or the return strokes of a sharpening cycle.

Other objectives and advantages of this invention will become more apparent from the following detailed description taken in conjunction with the drawings in which:

FIG. 3 is a cross-sectional view taken along lines 3—3 of FIG. 1;

FIG. 4 is a cross-sectional view taken along lines 4—4 of FIG. 3;

FIG. 5 is a cross-sectional view taken along lines 5—5 of FIG. 3;

FIG. 6 is an enlarged front view of the belt-type sharpener shown midway between its home position and its bottomed out position during a sharpening cycle;

FIG. 7 is a view similar to FIG. 6 illustrating the belt-type sharpener at the bottomed out or turn around point in a sharpening cycle;

FIG. 8 is a bottom view taken along lines 8—8 of FIG. 6; and

FIG. 9 is a cross-sectional view taken along lines 9—9 of FIG. 8.

Figure 1:
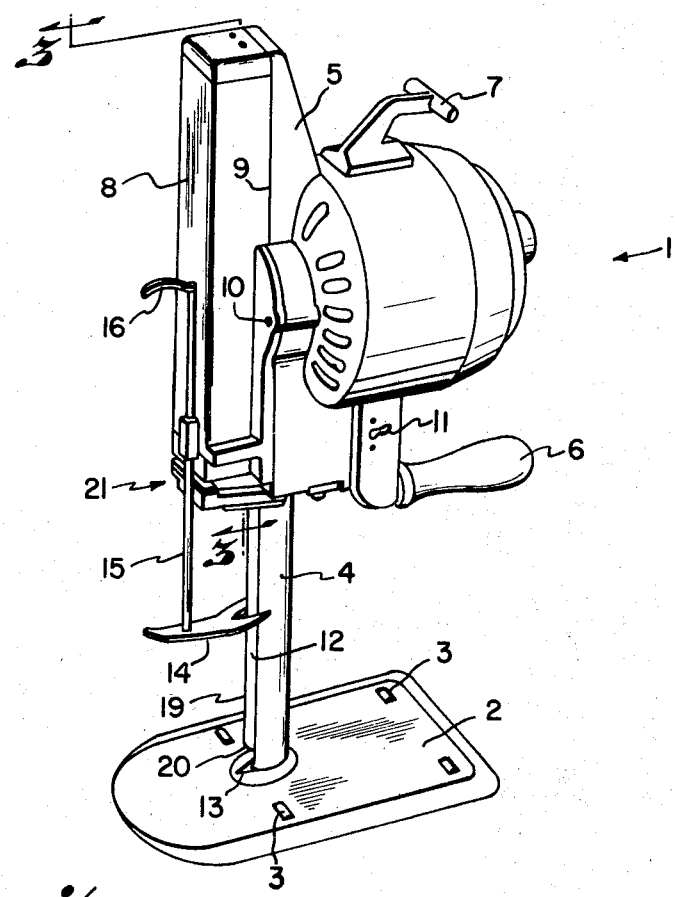
FIG. 1 is a perspective view of a cloth cutting machine having a belt-type blade sharpener embodying the present invention shown in the home position.

The general environment of the invention is best and particularly illustrated in FIG. 1 where there is shown a cloth cutting machine 1 having a base 2 with rollers 3 therein to permit free movement of the cloth cutting machine on a table surface, not shown, that supports a stack of fabric or cloth layers, not shown, to be cut. A vertical standard 4 extends upwardly from the base 2 and supports a housing 5. Handles 6 and 7 are attached to the housing 5 for guiding the cloth cutting machine 1 during use.

The housing 5 has electric motor means for continuously driving a knife blade reciprocating mechanism disposed therein. A removable mounting means or stationary housing 8 which partially contains the extendable drive means for the belt-type blade sharpener (selectively driven by the electric motor in housing 5) is secured to the housing 5 at line 9 by screws 10. A toggle switch 11 is mounted adjacent the bottom of the housing 5 to control the electric motor. As mentioned, both the knife blade reciprocating mechanism and the belt-type blade sharpener drive means are powered by the electric motor.

A knife 12 is supported within a recess formed in the vertical standard 4 and is mounted for reciprocating movement into and out of a slot 13 formed in the base 2. A pressure foot 14 is carried by vertical guard 15 and is adjustable in height to bear against the top layer of the cloth stack being cut. The upper end of the vertical guard 15 terminates in a handle 16 for raising and lowering the pressure foot 14. Such structure as has been generally described is more particularly and definitely set forth in the patent to Rockwood et al., U.S. 2,730,850.

The means provided for periodically sharpening the vertical 19 and bottom 20 edges of the knife blade 12, that is, the cutting edges of the blade, is a belt-type blade sharpener 21 that normally is held in a home position (see FIG. 1) when the machine 1 is being used to cut a stack of fabric layers. The extendable drive means for rotating endless belts 22 of the blade sharpener 21 and for reciprocating the blade sharpener through a single sharpening cycle, that is, through a downward stroke toward the base 2 and a return stroke back to the home position, is partially illustrated in FIG. 4 and is more particularly set forth in the Rockwood et al. patent referred to above. In FIG. 4 there is shown the exterior surface of a reversing drive shaft 23 for driving the endles belts 22 and for causing the blade sharpener 21 to traverse a sharpening cycle, that is, to move from its home position downward until it bottoms out at the base 2 and then return to the home position. The shaft 23 has an endless peripheral square thread 24 cut therein. That is, a thread path extends downwardly and connects at the lower end of the shaft 23 with a thread path extending upwardly which in turn connects at the upper end of the shaft 23 with the downwardly extending path thus providing a continuous thread path. The reversing drive shaft 23 is driven by the electric motor within housing 5, this being the same motor as reciprocates the knife blade 12, through a worm gear 25 journaled in sharpener drive housing 8 as at 26, 27. The drive shaft 23 is journaled for rotation in suitable bearings 28, 29 at its top and bottom respectively.

The interior of the reversing drive shaft 23 is provided with an axially positioned square hole 30 to receive a belt drive shaft 31 of the same square configuration as the interior of the shaft 23, the square drive shaft 31 being axially slidable relative to the housing 8. The belt drive shaft 31 extends down into the blade sharpener carriage or housing 32 where it drives a gear train 33, not completely shown, which in turn causes the endless belts 22 to rotate.

A sharpener tube 34 that is also axially moveable relative to the housing 8 surrounds the reversing drive shaft 23 and is concentric therewith. The sharpener tube 34 has a spring biased follower, not shown, that engages the endless peripheral thread 24 on the reversing drive shaft 23 as is fully described in the Rockwood et al. patent. The tube 34 and, hence, the blade sharpener 21, are prevented from rotation by guide means 35 to be subsequently described in detail, the tube 34 being affixed at its bottom end to the blade sharpener carriage 32 as at 36.

This sharpener drive mechanism as described above is shown and described in detail in the aforesaid Rockwood et al. patent. The reversing drive shaft 23 is driven only when a starting finger, not shown, is actuated. In the Rockwood et al. mechanism, the starting finger cannot be actuated to drive the reversing drive shaft 23 until the pressure foot 14 is resting on the base 2. This is a safety precaution to prevent the blade sharpener 21 from following its sharpening cycle until the cloth cutting machine has been completely removed from operating engagement with a stack of fabric layers. Thus, rotation of the reversing drive shaft 23 by worm gear 25 causes the sharpener tube 34 to move in a vertical reciprocating cycle because as it rotates, the spring biased follower, not shown, is forced to traverse the endless square thread 24 downward and then reverse its direction and return upwardly to the top of the thread to complete a single sharpening cycle. The reversing shaft 23 is automatically disconnected by means, not shown, from the electric motor in housing 5 after the sharpener tube 34 has completed one full sharpening cycle, that is, one downward stroke and one return stroke. If further sharpening is desired, the starting finger, not shown, must be actuated once again as is shown and described in the Rockwood et al. patent.

As mentioned, the sharpener tube 34 mounts or supports the blade sharpener carriage 32. The carriage 32 includes a housing cover 37 and a main body 38. The main body 38 of the sharpener carriage 32 is substantially V-shaped in configuration and provides opposed belt arms 39, see FIGS. 2 and 8. On each belt arm 39 there is mounted an endless belt 22 having an abrasive or grinding material 40 on its outer surface. Each belt 22 is rotated about a fixed stub shaft 41, each stub shaft 41 being driven by the gear train 33, only partially shown, which, in turn, is driven by the belt drive shaft 31. A hub 42 and drive pulley 43 are fixed to each stub shaft 41, the belt 22 passing around the drive pulley. Each belt 22 also passes, at its other end, around an idler pulley 44 mounted to a hub 45 which is rotatably mounted by idler shaft 46 to a sleeve 47 that slides over the free end 48 of the associated belt arm 39. A recess 49 provided within the end 48 of each belt arm 39 receives a compression spring 50 disposed between the bottom of the recess and the inner end of the sleeve 47. Such compression springs 50 act to hold the abrasive belts 22 in tension during operation of the blade sharpener 21 as they constantly urge the sleeves 47 to slide toward the end 48 of the belt arms 39.

Figure 2:
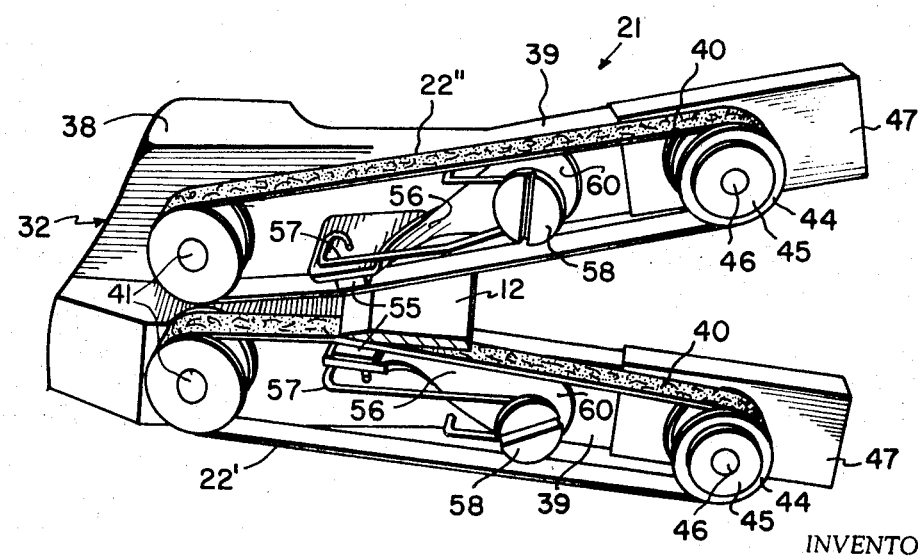
FIG. 2 is a bottom perspective view of the belt-type sharpener shown with the machine illustrated in FIG. 1.

In between the drive pulley 43 and the idler pulley 44, for each abrasive belt 22, there is provided a bevel adjustment device for the knife blade's cutting edge 19 that includes a pressure shoe or pad 55 mounted to a pad arm 56 that is spring 57 biased or pivoted in a manner so as to urge the abrasive belt 22 outwardly into engagement with the knife blade 12 between the belt arms 39, see FIGS. 2, 8, and 9. The pad arm 56 is connected to the belt arm 39 by means of a shoulder screw 58. The shoulder screw 58 passes through an eccentric bushing 59 which in turn passes through a collar 60 integral with the pad arms 56. The shoulder portion of the shoulder screw 58 receives the coiled end 61 of the spring 57 which is so disposed on each belt arm as to continuously urge or pivot the pressure pad 55 against the inner surface of the endless belt 22 at that point on the belt where contact of the belt with the cutting edge of the knife blade 12 is desired, as described above. Thus, by means of the shoulder screw 58, eccentric shoulder bushing 59 and pad arm 56 structure for each belt 22 there is provided means for adjusting the angle and length of grind or bevel for the vertical cutting edge of the knife blade 12. This for the reason that because each pad arm 56 is pivoted on an eccentric bushing 59, by merely rotating the bushing 59 by a screwdriver inserted in the slot of the shoulder screw 58, the angle at which the abrasive belt grinds the knife blade's cutting edge may be varied because the angle of the flat outer surface 62 of the pressure pad 55 is varied relative to the vertical plane of the knife blade, thereby easily and simply varying the bevel length for the vertical cutting edge. Thus, the angle of bevel for the vertical cutting edge of the knife blade 12 can be varied at will.

A divider or pressure pad separator 63 is mounted to the bottom of the sharpener drive housing 8 by screw 64, and has a pointed end 65 extending down beneath the housing 8. The separator 63 engages and separates the pressure pads 55 one from the other when the belt sharpener is received back at its home or storage position illustrated in FIG. 3 and this, in turn, separates the abrasive belts from engagement with the knife blade when the sharpener is not operating and the cloth cutting machine is being utilized to cut stacks of cloth, see FIG. 3.

It will be apparent from FIGS. 3, 4, 6 and 7 that the endless rotating abrasive belts 22 are positioned in different horizontal planes, that is, they are positioned in horizontal planes one below the other. FIG. 7 particularly illustrates the problem that occurs when the blade sharpener 21 bottoms out, that is, reaches the half-way point, during its sharpening cycle. At this point the lower belt 22' is no longer in sharpening engagement with the knife blade 12 because the housing 32 must be lowered to a sufficient extent so that the upper belt 22'' can adequately sharpen its side of the knife blade's bottom corner area at the bottom of the sharpener stroke. Thus, in accordance with this invention, pad arrester means 66 are provided whereby the bottom endless belt 22' is prevented from being urged underneath the bottom edge 20 of the knife blade 12 to prevent the knife blade on a downward stroke from slicing through or otherwise damaging the bottom endless belt 22' when the belt sharpener 21 starts the return stroke on its sharpening cycle. The pad arrester means 66 by which the bottom belt 22' is prevented from moving underneath the bottom edge of the knife blade, even though it is continuously urged in that direction by means of the spring 57 biased pressure pad 55 that is in continued engagement with that belt, is particularly illustrated in FIGS. 3, 4, 6 and 7.

As is shown in FIGS. 3, 4, 6 and 7, the pad arrester means 66 comprises a control rod 67 slideably mounted within the stationary housing 8 and extending therefrom through an aperture 68. The control rod 67, at its lowermost end, is interconnected with an upper extension 69 of the bottom belt's 22' pad arm 56 by connecting means that includes a tension spring 70. The tension spring 70 is fixed at one end to the extension 69 of the pad arm 56, and is fixed to the bottom end of the control rod 67 through tension adjustment means in the form of an adjusting screw 71 and lock nut 72. The screw 71 and lock nut 72 are provided for the purpose of permitting adjustment of the tension on the spring 70 so that the pressure of pad 55 on the belt 22' may be relieved at the precise moment that the belt 22' passes beneath the knife blade 12 as explained below.

The control rod 67 extends up from the blade sharpener carriage 32 through an eye 73 integral with the housing cover 37 up through the hole 68 in the bottom of the sharpener drive housing 8 and provides, at its uppermost end, a stop pin 74, see FIGS. 3 and 4. The stop pin 74 is engageable with abutment means in the form of a shelf 75 cast into the sharpener drive housing 8. The distance the stop pin 74 extends above the shelf 75 when the blade sharpener 21 is in the home position illustrated in FIGS. 3 and 4 is approximately equal to the downward stroke distance in the sharpening cycle that the blade sharpner must traverse in sharpening the knife blade 12. A guide 67 and is positioned between the bottom of the sharpener drive housing 8 approximately adjacent the shelf 75 to aid in maintaining alignment of the control rod 67 relative to the housing 8 so as to insure that the stop pin 74 will engage the shelf 75 when the belt sharpener achieves its extended or bottomed out position, see FIG. 7.

A bumper bushing 77 is provided on the control rod 67 and is positioned between the bottom of the sharpener drive housing 8 and the blade sharpener carriage 32 so as to cushion the return of the blade sharpener 21 to its home position illustrated in FIGS. 3 and 4 and to prevent chatter or vibration of the control rod with the sharpener drive housing when the cloth cutting machine is performing its cloth cutting tasks.

It will be noted that the belt drive shaft 31 is not centered relative to the blade sharpener carriage 32, that is, it is not in that plane which passes through the notch of the V formed by the belt arms 39 and, in fact, it is substantially off to one side from that plane, see FIGS. 3 and 8. The geometry of the drive shaft 31 relative to the vertical plane in which the knife blade 12 reciprocates, that is, the center plane dividing the two belts of the belt sharpener, and the paths of movement for the endless abrasive belts 22 would cause the blade sharpener 21 to cock or twist relative to the plane of the reciprocating knife blade without the apparatus of this invention. Such twisting or cocking on the part of the blade sharpener 21 causes the knife blade 12 to be ground at a different angle on one side than on the other, thereby decreasing the cutting efficiency of the knife blade. Also, such nonsymmetrical sharpening may cause the bottom edge 20 of the blade 12 to be deformed over a period of time after a number of sharpening cycles have been effected, thereby even further decreasing the cutting efficiency of the knife blade. To counteract this problem there has been provided finger guide means 35 on the opposite side of the plane defined by the reciprocating knife blade in which the belt drive shaft 31 resides, see FIGS. 3 and 5. Such finger guide means 35 include a tab grip 81 adapted to slide along the edge of a torque arresting plate 82 fixed to the sharpener drive housing 8. The tab grip 81 is interconnected with the drive means, that is, the sharpener tube 34 by means of an arm 83. Thus, as the tube 34, reciprocates up and down because of rotation of reversing drive shaft 23 to cause the belt sharpener 21 to follow its sharpening cycle, the tab grip 81 slides along the guide edge of the torque arresting plate 82 and prevents the torque generated by the drive shafts 23, 31 from being transmitted to the blade sharpener carriage 32. This, in turn, insures that the blade sharpener 21 is reciprocated in a constant plane and insures that the knife blade 12 is ground evenly on each side of its cutting edge.

In operation, as the blade sharpener housing 32 commences its downward stroke of a sharpening cycle it carries the control rod 67 with it, see FIG. 6, and the belts 22 are continuously urged into sharpening engagement with the vertical cutting edge of the knife blade 12 by means of the spring 57 biased pressure pads 55. When the lower belt 22' is in operating engagement with the cutting edge 19 of the knife blade 12, the tension spring 70 and control rod 67 are relaxed. However, once the lower belt 22' starts to leave sharpening engagement with the vertical edge 19 of the knife blade to bottom out in its sharpening cycle, whereby the lower belt 22' will be positioned beneath the bottom edge 20 of the knife blade 12, the control rod 67 in combination with the tension spring 70 prevents the spring 57 biased pressure pad 55 from forcing that belt 22' underneath the bottom edge 20 of the knife blade, see FIG. 7. The stop pin 74, when it engages the shelf 75 of housing 8 stops the control rod 67 at the same position time after time and permits the precise tension to be exerted on the spring 70 time after time so that the belt 22' is not pushed into the reciprocative path of the knife blade to be sliced or otherwise damaged when the blade sharpener housing 32 commences its return stroke of the sharpening cycle. The lock nut 72 and adjustment screw 71 are provided to make initial and, thereafter, periodic adjustments on the tension of the spring 70 so that the lower belt 22', in disengaging the knife blade and then reengaging the knife blade at the bottom portion of the sharpening cycle, does not, after numerous sharpenings, cause undulations or other undesirable characteristics on the cutting 19 and bottom 20 edges of the knife blade 12. Thus, the tension on the spring 70 can be varied when the pad arrester 66 is at its extended most position so that adverse affects on the blade's cutting edges do not take place. A pad arrester 66 is not required in the cutting machine illustrated for the upper endless belt 22' and its corresponding pressure pad for the reason that this belt never leaves engagement with the knife blade during a sharpening cycle and, therefore, a pad arrester is not required for that upper belt.

As mentioned, because the tab grip 81 is fixedly mounted to the sharpener tube 34, as the tube is carried downward during the downward stroke of the blade sharpener 21, as well as during the return stroke, the tab grip slides along the edge of the torque arrester plate 82 to insure that the belt sharpener 21 does not cock at any point during its cycle relative to the vertical plane of the knife blade 12. Preferably, the tab grip 81 is made of a polyethylene material so that no binding between the tab grip and the surface of the torque arrester plate 82 occurs during operation of the blade sharpener.

Having described completely and in detail the preferred embodiment of my invention, what I desire to claim and protect by Letters Patent is:

1. In an endless belt-type blade sharpener having an upper and a lower belt used with a cloth cutting machine having a continuously reciprocating vertical blade, said belts being operated by extendable drive means linking said belts with motor means positioned in a housing that is stationary relative to the vertical cyclical operation of said sharpener, the improvement comprising pad arrester means connecting the lower belt's pressure pad mounted on said sharpener with fixed mounting means on said machine, said pad arrester means including a control rod extendable downward and retractable upward relative to said fixed mounting means in substantial conformity to the downward and upward movement, respectively, of said sharpener, and connecting means relating said control rod to said pad, said connecting means and control rod cooperating to prevent said pad from urging the lower belt into the reciprocating blade's path when said sharpener bottoms out as it ends a downward stroke and begins a return stroke of a sharpening cycle.

2. An improvement as set forth in claim 1 wherein said mounting means comprises said stationary housing, said control rod being extendable downward from and retractable upward into the inside of said stationary housing.

3. An improvement as set forth in claim 1 wherein said connecting means comprises a tension spring.

4. An improvement as set forth in claim 3 wherein said connecting means further comprises
adjustment means interposed between said pad and said control rod, said adjustment means being connected to said tension spring for adjusting the tension on said spring.

5. An improvement as set forth in claim 2 and further including
a stop pin affixed to the upper end of said control rod that is always within said stationary housing, and
abutment means fixed within said stationary housing to cooperate with said stop pin as said belt sharpener bottoms out during a sharpening cycle.

6. In an endless belt-type blade sharpener having an upper and a lower belt used with a cloth cutting machine having a continuously reciprocating vertical blade, said belts being operated by extendable drive means linking said belts with motor means positioned in a housing that is stationary relative to the vertical cyclical operation of said sharpener, the improvement comprising
torque arrester means connected with said blade sharpener, said torque arrester means including a torque arrester plate fixed in said housing, and finger guide means connected to said drive means and adapted to cooperate with a guide edge of said plate, said finger means being connected to said drive means in a manner that permits said finger to traverse along said guide edge a distance equivalent in length to the length of the belt sharpener's sharpening cycle during the operation of said sharpener, and said torque arrester plate and said finger guide means cooperating to maintain said sharpener in the desired attitude without cocking during a sharpening cycle.

7. An improvement as set forth in claim 6 wherein said finger means is positioned on one side of a center plane dividing the two belts of said belt sharpener and said drive means is positioned on the other side.

8. A bevel adjustment device mounted on a belt-type blade sharpener used with a cloth cutting machine, the bevel adjustment device being operable to permit desirable changes made to the length of bevel on the knife blade's cutting edge comprising a pad mounted to a pad arm at one end of said pad arm, the other end of said pad arm being pivotally connected to the sharpener at the other end, spring means constantly urging said pad against an endless belt for establishing a ground bevel on the knife blade's cutting edge, and an eccentric bushing associated with the connection of said pad arm and said sharpener, rotation of said eccentric bushing permitting the length of the ground bevel to be varied.

9. Apparatus as set forth in claim 8 wherein said eccentric bushing is mounted for rotation in a collar connected with said pad arm, said collar providing the means by which said pivotal connection is established.

10. Apparatus as set forth in claim 9 wherein said collar is connected to said sharpener by a shoulder screw, said eccentric bushing being positioned between said collar and said shoulder screw.

References Cited
UNITED STATES PATENTS

| | | | |
|---|---|---|---|
| 2,060,197 | 11/1936 | Greenbaum | 51—246 |
| 2,183,786 | 12/1939 | Clark | 51—246 |
| 2,183,788 | 12/1939 | Clark | 51—246 |
| 2,281,023 | 4/1942 | Clark | 51—246 |
| 2,604,741 | 7/1952 | Clark | 51—246 |
| 2,753,670 | 7/1956 | Carapucci | 51—246 |
| 2,829,474 | 4/1958 | Clark | 51—246 |

WILLIAM R. ARMSTRONG, Primary Examiner